(12) United States Patent
Heideveld

(10) Patent No.: US 10,906,605 B2
(45) Date of Patent: Feb. 2, 2021

(54) DUAL CROWN STEERING ASSEMBLY

(71) Applicant: Trek Bicycle Corporation, Waterloo, WI (US)

(72) Inventor: Roy Heideveld, Deventer (NL)

(73) Assignee: TREK BICYCLE CORPORATION, Waterloo, WI (US)

( * ) Notice: Subject to any disclaimer, the term of this patent is extended or adjusted under 35 U.S.C. 154(b) by 213 days.

(21) Appl. No.: 16/050,410

(22) Filed: Jul. 31, 2018

(65) Prior Publication Data

US 2020/0039598 A1 Feb. 6, 2020

(51) Int. Cl.
*B62K 21/04* (2006.01)
*B62K 21/06* (2006.01)
*B62K 21/22* (2006.01)

(52) U.S. Cl.
CPC .............. *B62K 21/04* (2013.01); *B62K 21/06* (2013.01); *B62K 21/22* (2013.01)

(58) Field of Classification Search
CPC ......... B62K 21/04; B62K 21/06; B62K 21/22
USPC ....................................................... 280/280
See application file for complete search history.

(56) References Cited

U.S. PATENT DOCUMENTS

| 5,429,381 | A | 7/1995 | Mercat et al. |
| 7,210,694 | B2 | 5/2007 | Trenne |
| 8,684,386 | B2 | 4/2014 | Matthews et al. |
| 2003/0034628 | A1* | 2/2003 | Chien ................ B62K 21/06 |
| | | | 280/280 |
| 2008/0073870 | A1* | 3/2008 | Lane ..................... B62K 21/06 |
| | | | 280/280 |
| 2008/0100028 | A1* | 5/2008 | Mrdeza ................. B62K 21/04 |
| | | | 280/280 |
| 2011/0121538 | A1* | 5/2011 | Giroux .................. B62K 23/06 |
| | | | 280/280 |
| 2013/0026732 | A1 | 1/2013 | Kohl et al. |

FOREIGN PATENT DOCUMENTS

| CA | 2781239 | 1/2013 |
| EP | 0490120 | 6/1992 |
| EP | 1612134 | 1/2006 |
| EP | 2543579 | 1/2013 |

(Continued)

OTHER PUBLICATIONS

Extended European Search Report issued on EP18209589.3, dated May 24, 2019.

*Primary Examiner* — Tony H Winner
*Assistant Examiner* — Felicia L. Brittman
(74) *Attorney, Agent, or Firm* — Bell & Manning, LLC; Christopher Kalafut

(57) ABSTRACT

A steering assembly for a bicycle includes a front fork that includes an upper crown, a lower crown, and a rigid crown connector that connects the upper crown to the lower crown. The steering assembly also includes an upper cone configured to mount to the upper crown of the front fork. The upper cone includes an upper cone bearing interface configured to interact with an upper bearing assembly seated in an upper portion of a head tube of a bicycle frame. The steering assembly also includes a lower cone configured to mount to the lower crown of the front fork. The lower cone includes a lower cone bearing interface configured to interact with a lower bearing assembly seated in a lower portion of the head tube of the bicycle frame.

17 Claims, 13 Drawing Sheets

(56) References Cited

FOREIGN PATENT DOCUMENTS

| EP | 2718173 | 4/2014 | |
|----|---------|--------|---|
| EP | 2718173 B1 * | 9/2016 | ............. B62K 21/18 |
| FR | 1084795 | 1/1955 | |
| WO | WO2017/066678 | 4/2017 | |
| WO | WO2017144105 | 8/2017 | |

* cited by examiner

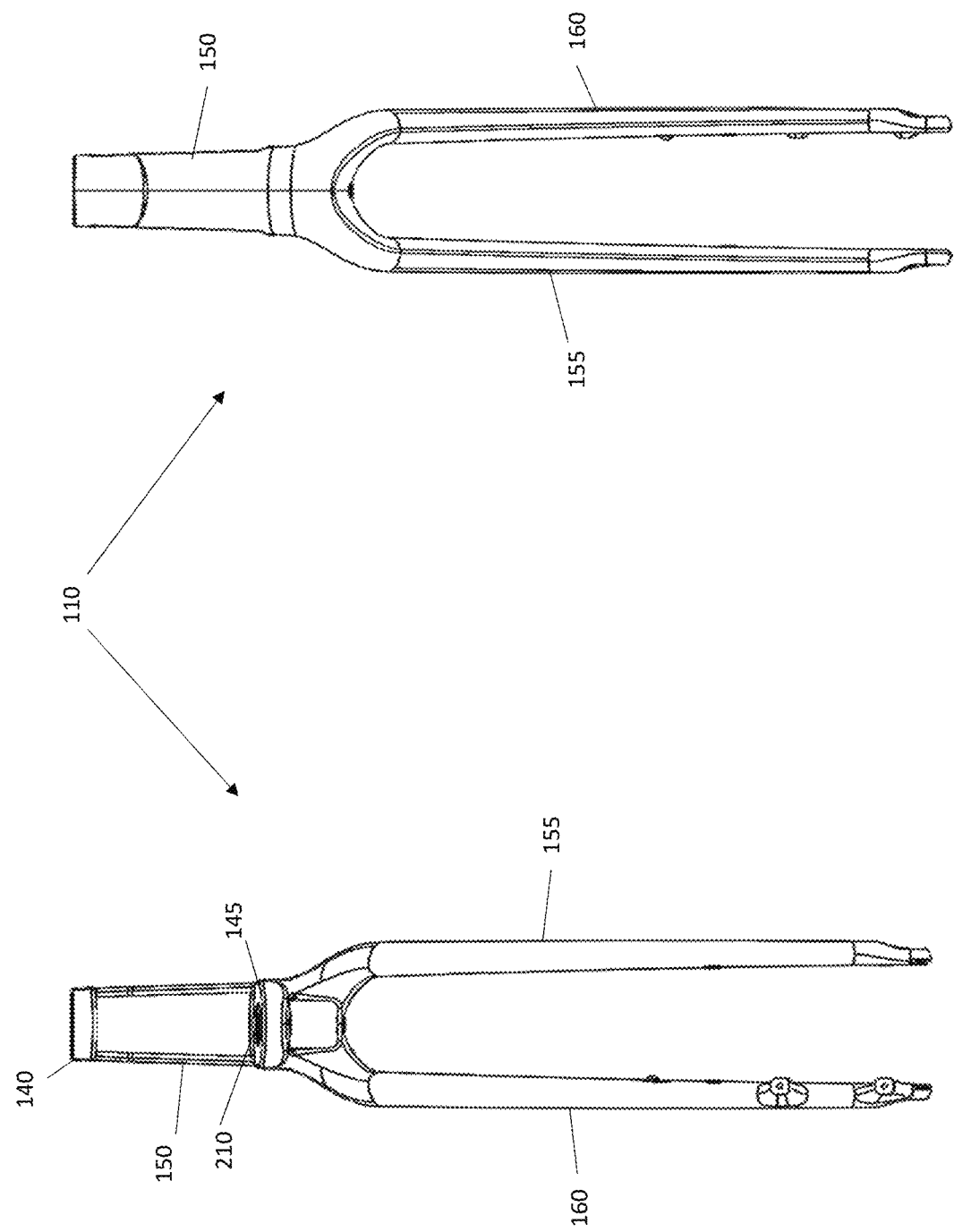

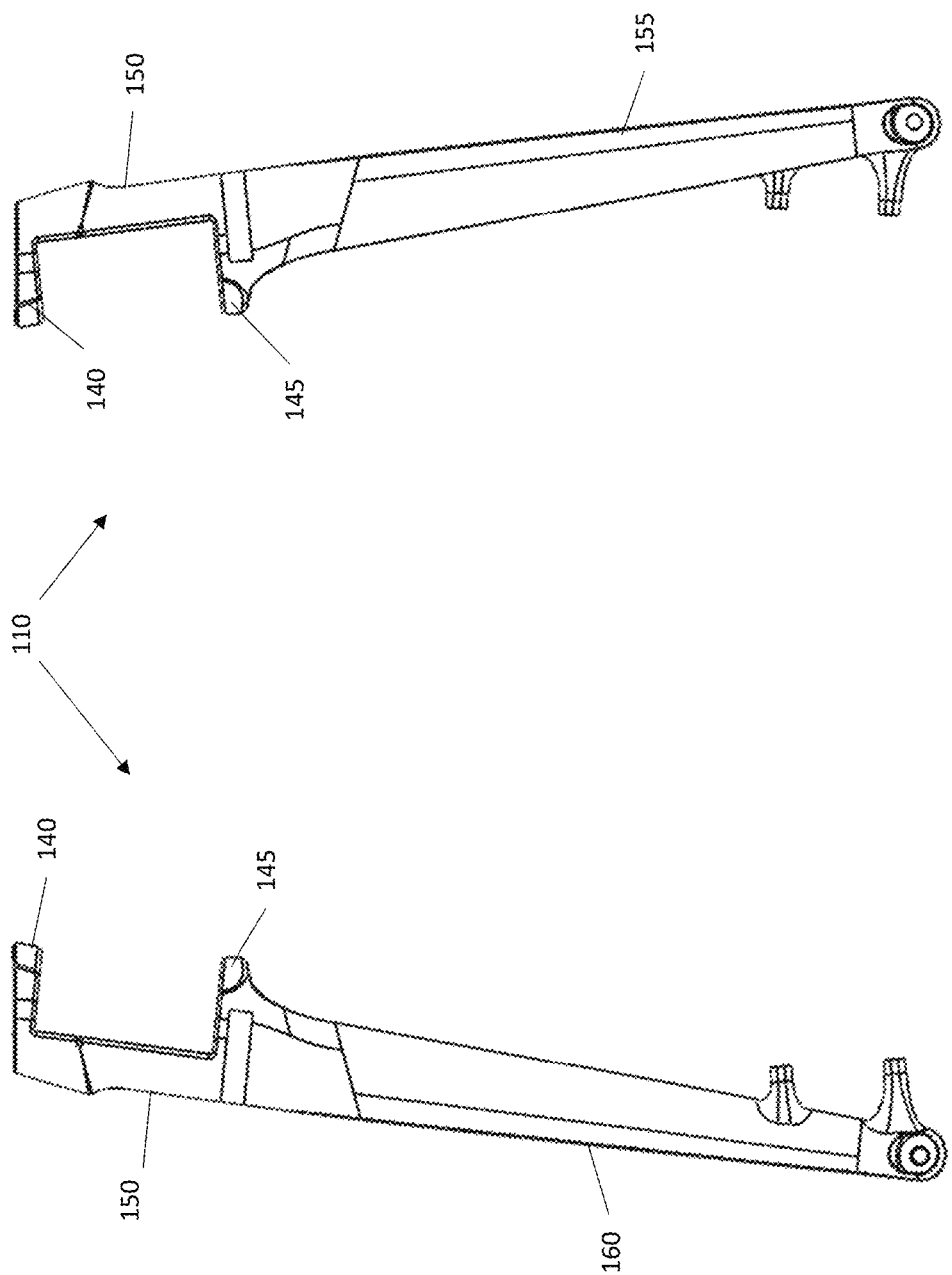

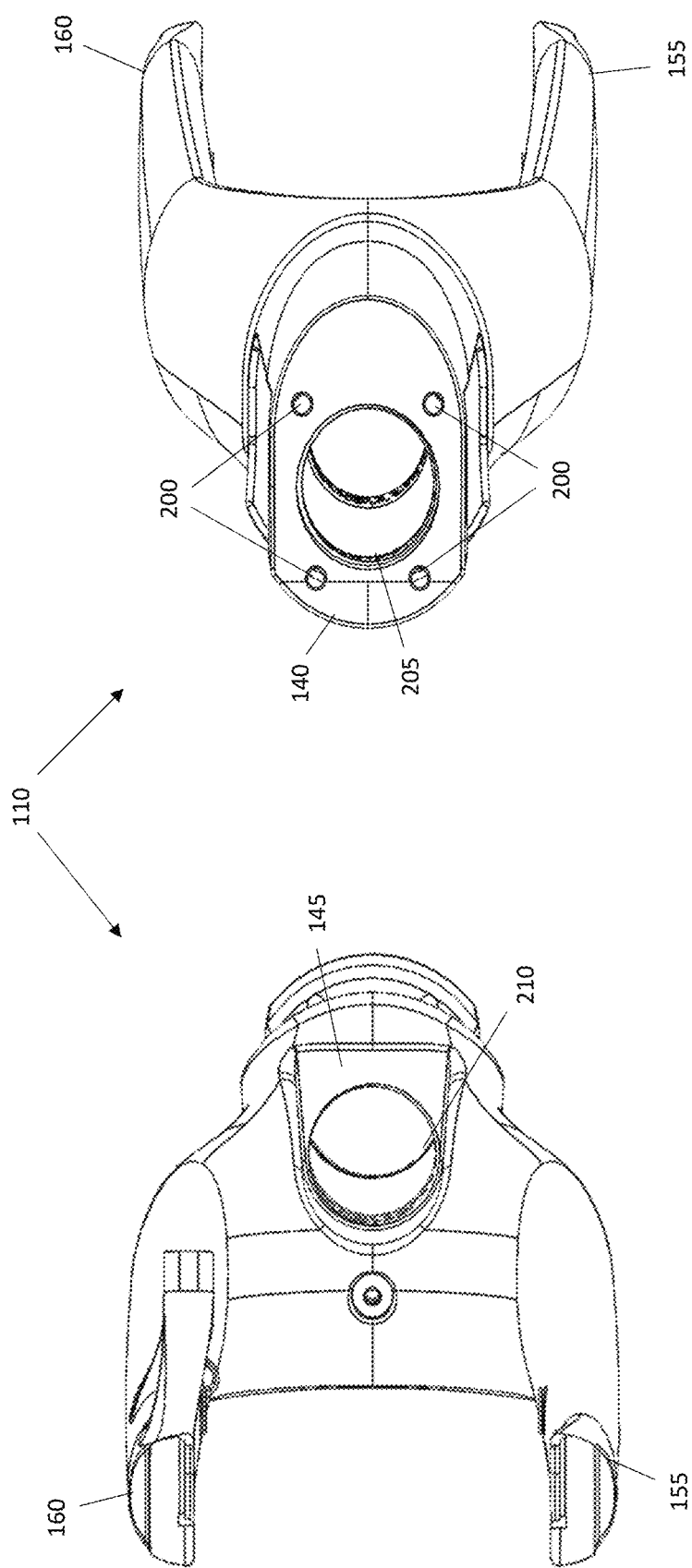

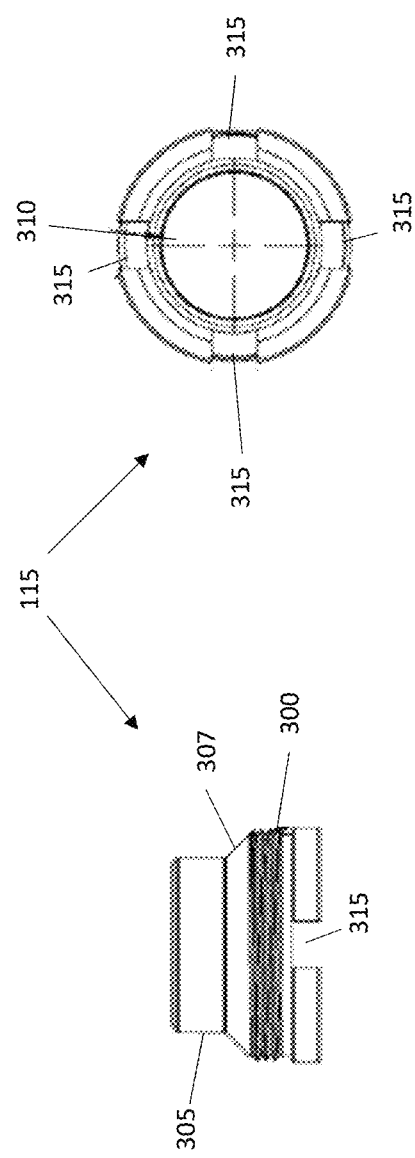

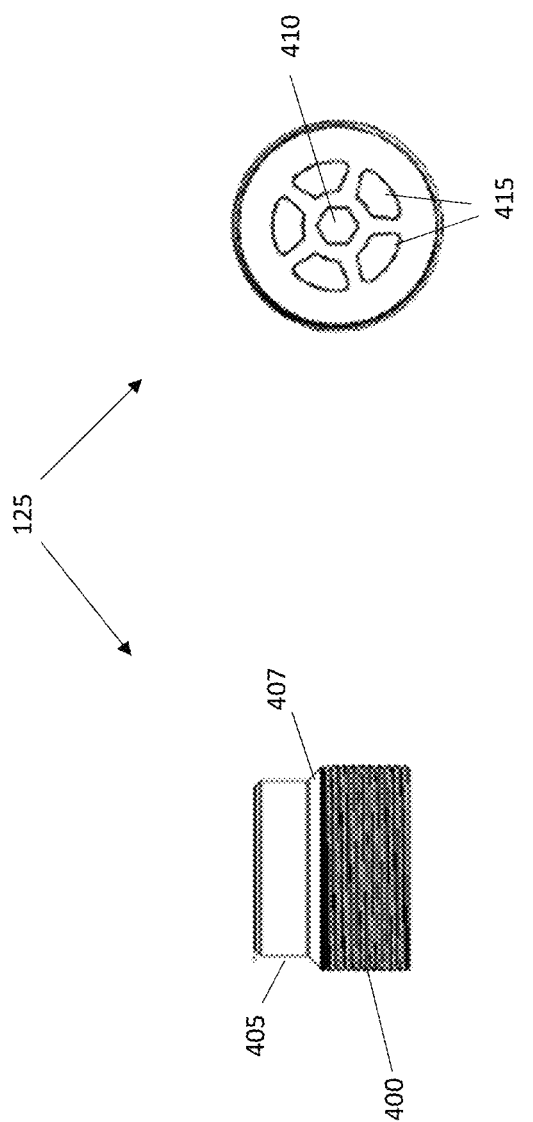

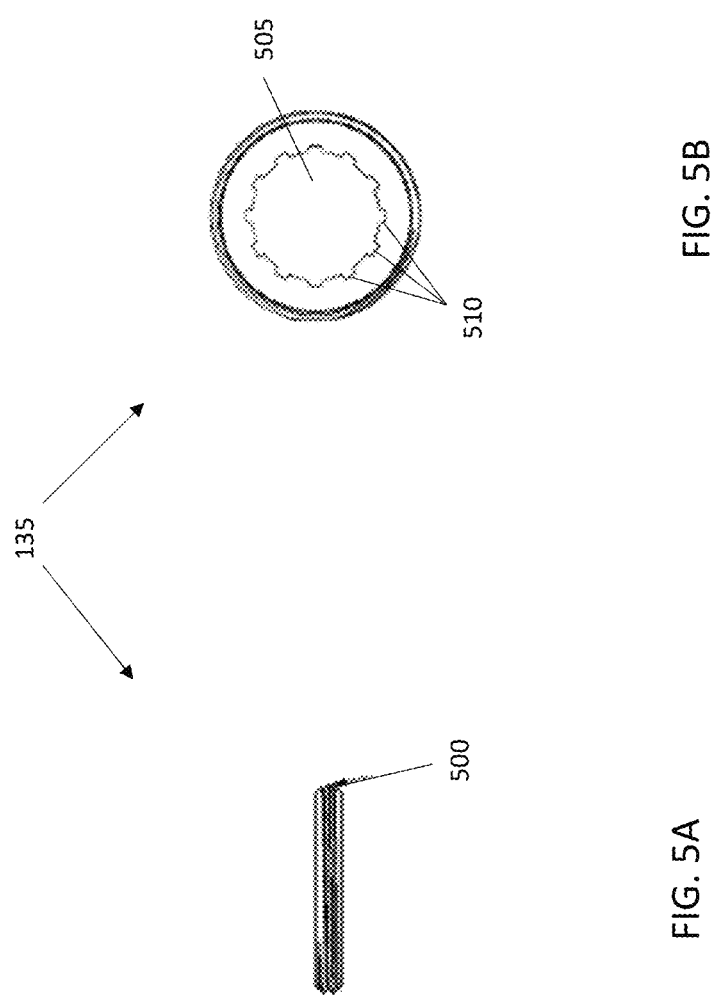

DUAL CROWN STEERING ASSEMBLY

BACKGROUND

Traditional bicycle steering systems include a bicycle fork that is mounted to a handlebar by way of a steerer tube. The bicycle fork often includes two blades that are spaced apart such that the front wheel of the bicycle mounts between the blades. The two blades meet at a crown of the bicycle fork, and the steerer tube extends from the crown up through a head tube portion of the bicycle frame. The handlebar mounts to the steerer tube such that turning the handlebar causes the bicycle fork and the wheel mounted to the fork to turn accordingly. The steerer tube interfaces with the head tube portion of the frame by way of a headset, which includes bearing assemblies to provide low friction movement of the steerer tube within the head tube. Depending on the configuration, the steerer tube may be threaded or unthreaded.

SUMMARY

An illustrative steering assembly for a bicycle includes a front fork that includes an upper crown, a lower crown, and a rigid crown connector that connects the upper crown to the lower crown. The steering assembly also includes an upper cone configured to mount to the upper crown of the front fork. The upper cone includes an upper cone bearing interface configured to interact with an upper bearing assembly seated in an upper portion of a head tube of a bicycle frame. The steering assembly also includes a lower cone configured to mount to the lower crown of the front fork. The lower cone includes a lower cone bearing interface configured to interact with a lower bearing assembly seated in a lower portion of the head tube of the bicycle frame.

An illustrative method of assembling a steering assembly includes mounting an upper bearing assembly in an upper portion of a head tube of a bicycle frame and mounting a lower bearing assembly in a lower portion of the head tube. The method also includes mounting an upper cone to an upper crown of a front fork such that a bearing interface of the upper cone is positioned in an interior of the upper bearing assembly within the upper portion of the head tube. The method further includes mounting a lower cone to a lower crown of the front fork such that a bearing interface of the lower cone is positioned in an interior of the lower bearing assembly within the lower portion of the head tube. The lower crown is integrally connected to the upper crown by a rigid crown connector.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 2C is a rear elevation view of the front fork in accordance with an illustrative embodiment.

FIG. 2D is a front elevation view of the front fork in accordance with an illustrative embodiment.

FIG. 2E is a left elevation view of the front fork in accordance with an illustrative embodiment.

FIG. 2F is a right elevation view of the front fork in accordance with an illustrative embodiment.

FIG. 2G is a bottom view of the front fork in accordance with an illustrative embodiment.

FIG. 2H is a top view of the front fork in accordance with an illustrative embodiment.

FIG. 3A is a side view of the upper cone in accordance with an illustrative embodiment.

FIG. 3B is a top plan view of the upper cone in accordance with an illustrative embodiment.

FIG. 4A is a side view of the lower cone in accordance with an illustrative embodiment.

FIG. 4B is a bottom plan view of the lower cone in accordance with an illustrative embodiment.

FIG. 5A is a side view of the lower cone locknut in accordance with an illustrative embodiment.

FIG. 5B is a bottom plan view of the lower cone locknut in accordance with an illustrative embodiment.

DETAILED DESCRIPTION

Traditional bicycles typically have one or more cables running from a handlebar of the bicycle to various other locations on the bicycle. For example, a bicycle may include a front brake cable running from a front brake controller mounted on the handlebar to a front brake of the bicycle. Similarly, a bicycle can include a rear brake cable running from a rear brake controller mounted on the handlebar to a rear brake of the bicycle. Bicycles can also have one or more gear shifting cables running from a gear shift controller on the handlebar to a gear shift assembly. Electronic bicycles can also include power cables, control cables, feedback cables, electronic wiring, etc. that runs from the handlebar to a motor, battery, etc. of the bicycle.

In traditional bicycles, the cables mounted to the handlebar are often routed external to the bicycle frame, which is not ideal with respect to bicycle aesthetics and air resistance. The cables are routed externally because traditional steering systems include a steerer tube (or other component) positioned within a head tube of the bicycle frame. The steerer tube rotates within the head tube in conjunction with upper and lower bearing sets and connects a crown of the front fork to a handlebar set. The placement of the steerer tube makes it difficult or impossible to route cables from the handlebar down into the head tube and to the rest of the bicycle frame.

Described herein is a steering assembly that enables internal routing of cables from the handlebar to various other components of the bicycle. Specifically, described herein is a steering assembly that does not utilize a steerer tube within the head tube of the bicycle frame. Rather, the front fork includes an upper crown (or upper flange) that mounts to a top of the head tube and a bottom crown (or bottom flange) that mounts to a bottom of the head tube. An upper bearing assembly is seated within an upper portion the head tube and interfaces with a portion of an upper cone that is mounted to the upper crown, and a lower bearing assembly is seated within a lower portion of the head tube and interfaces with a portion of a lower cone that is mounted to the lower crown. As described in detail below, the proposed steering assembly provides an open passageway such that cables can be internally routed from the handlebar through the upper crown of the front fork and into the head tube of the bicycle frame.

Figure 1:
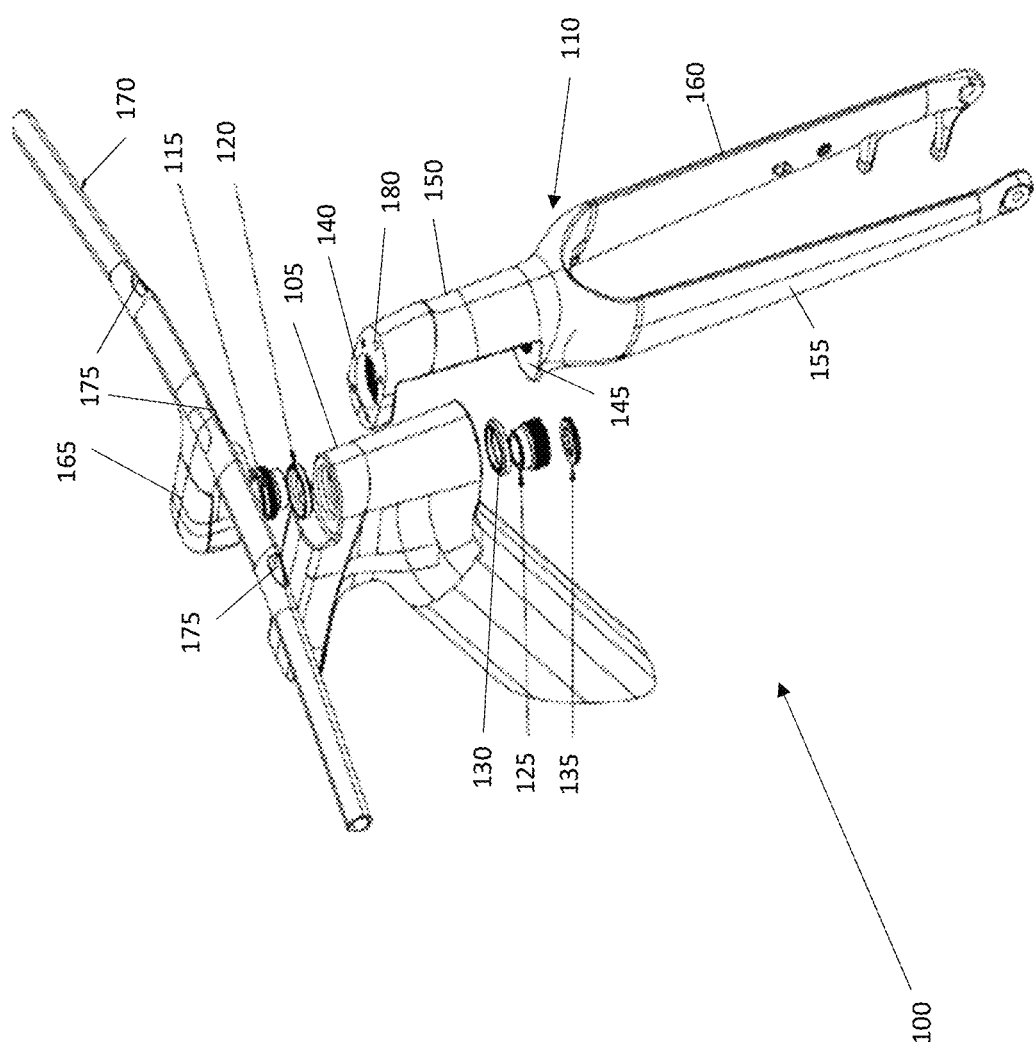
FIG. 1 is an exploded view of a steering assembly in accordance with an illustrative embodiment.

FIG. 1 is an exploded view of a steering assembly 100 in accordance with an illustrative embodiment. The steering assembly 100 mounts to a head tube 105 of a bicycle frame (only a portion of which is depicted in FIG. 1). The steering assembly 100 includes a front fork 110, an upper cone 115, an upper bearing assembly 120, a lower cone 125, a lower bearing assembly 130, a lower cone locknut 135, a handlebar bracket 165, and a handlebar 170. In alternative embodiments, the steering assembly 100 can include fewer, additional, and/or different components. The front fork 110 is described in more detail with reference to FIGS. 2A-2H, the upper cone 115 is described in more detail with reference to FIGS. 3A and 3B, the lower cone 125 is described in more detail with reference to FIGS. 4A and 4B, and the lower cone locknut 135 is described in more detail with reference to FIGS. 5A and 5B.

The front fork 110 depicted in FIG. 1 includes an upper crown (or upper flange) 140, a lower crown (or lower flange) 145, a rigid crown connector 150 that connects the upper crown 140 and the lower crown 145, a first blade 155, and a second blade 160. A wheel can be mounted between the first blade 155 and the second blade 160 using any technique known in the art. In an alternative embodiment, the front fork can include two (or more) upper crowns, two (or more) lower crowns, and two (or more) corresponding rigid crown connectors to connect the upper crowns to the lower crowns. For example, in one embodiment, the front fork can include a first upper crown, a first lower crown, and a first rigid crown connector corresponding to the first blade, and a second upper crown, a second lower crown, and a second rigid crown connector corresponding to the second blade.

As described in more detail below, the upper cone 115 interfaces with the upper bearing assembly 120 seated within the head tube 105 and the lower cone 125 interfaces with the lower bearing assembly 130 seated within the head tube 105. Specifically, the upper cone 115 includes a threaded portion and a bearing interface. The threaded portion of the upper cone 115 screws into a threaded opening in the upper crown 140 of the front fork 110. The bearing interface of the upper cone 115 receives the upper bearing assembly 120, which is mounted (when assembled) to a bearing seat within an upper portion of the head tube 105. The lower cone 125 also includes a threaded portion and a bearing interface. The threaded portion of the lower cone 125 screws into a threaded opening in the lower crown 145 of the front fork 110. The bearing seat of the lower cone 125 receives the lower bearing assembly 130, which is mounted (when assembled) to a bearing seat within a lower portion of the head tube 105. The lower cone locknut 135 threads onto the lower cone 125 to prevent unintended rotation of the lower cone 125.

The rigid crown connector 150 is positioned external to the head tube 105, and is contoured to match a contour of the external surface of the head tube 105. The rigid crown connector 150 is a rigid member that connects the upper crown 140 to the rest of the front fork 110. The rigid crown connector 150 therefore ensures that any rotation of the upper crown 140 results in corresponding rotation of the rest of the front fork 110. Additionally, the handlebar bracket 165 mounts to the upper crown 140 of the front fork 110, and the handlebar 170 mounts to the handlebar bracket 165. As a result, rotation of the handlebar 170 causes corresponding rotation of the handlebar bracket 165, the front fork 110, and a wheel mounted between the first blade 155 and the second blade 160 of the front fork 110. Steering of the bicycle can therefore be accomplished without the use of a steerer tube positioned within the head tube.

The handlebar 170 includes openings 175 to internally receive one or more cables (not shown) that are attached to the handlebar 170. The one or more cables can be brake cables, shifting cables, power cables, electrical wiring, etc. In an illustrative embodiment, the one or more cables are routed from an external position on the handlebar 170 to the openings 175 in the handlebar 170, through an opening in the handlebar 170 that aligns with the handlebar bracket 165, through a cavity in the handlebar bracket 165, through the upper cone 115 mounted to the upper crown 140, and into the head tube 105. From the head tube 105, the one or more cables can be routed within the bicycle frame to any other location on the bicycle. Routing of the one or more cables through the head tube 105 is facilitated by the absence of a steerer tube, which results in an unobstructed cavity within the head tube 105. As discussed in more detail below, a front brake cable and/or other cables may be routed through the rigid crown connector 150 external to the head tube 105, and to a front brake or into one of the first blade 155 and the second blade 160. Specifically, an opening 180 in the upper crown 140 can be used to route cables from the handlebar 170 to one or both of the first blade 155 and the second blade 160, or directly to a front brake. In alternative embodiments, the opening 180 may not be included.

Figure 2B:
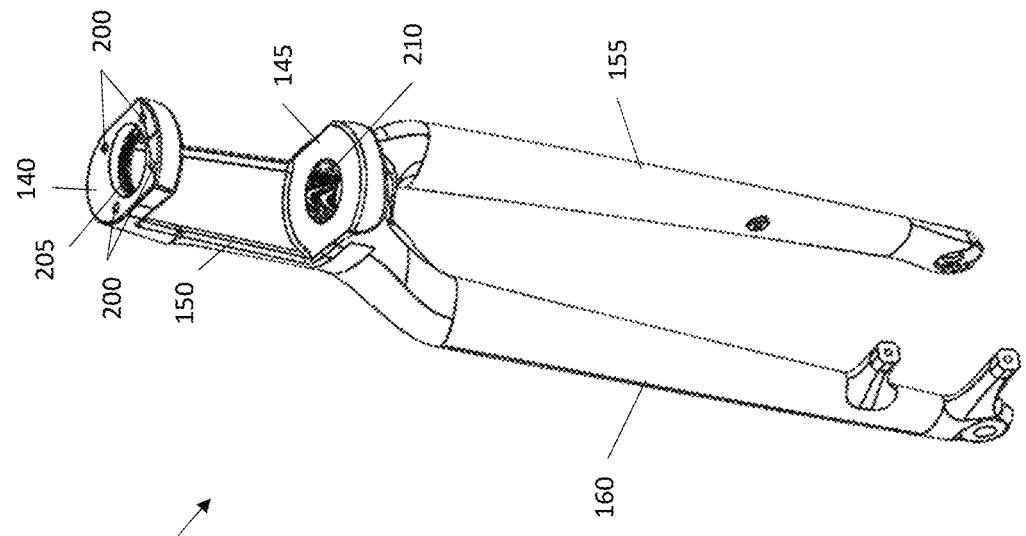
FIG. 2B is a rear perspective view of the front fork in accordance with an illustrative embodiment.
Figure 2A:
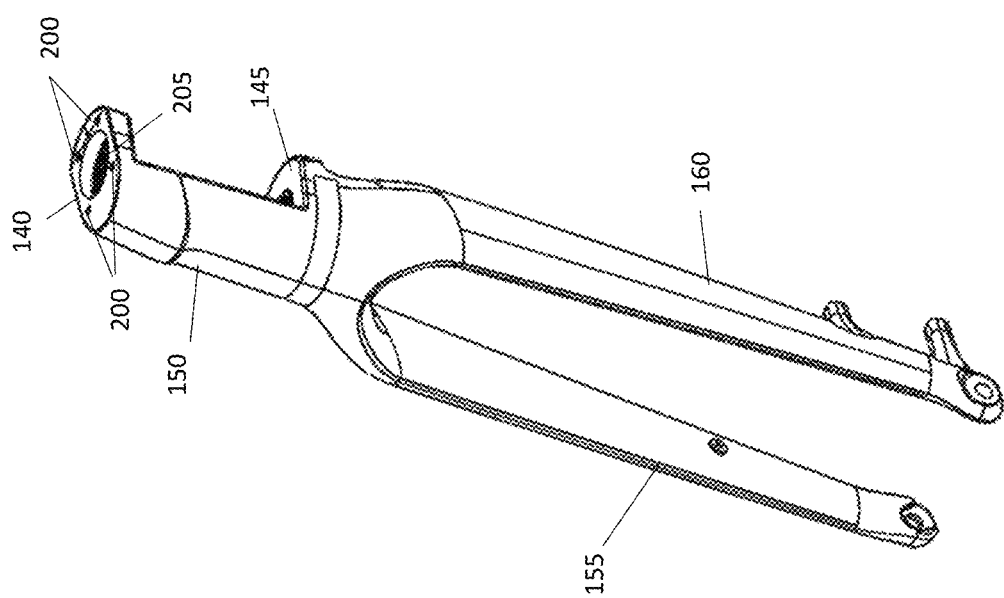
FIG. 2A is a front perspective view of a front fork in accordance with an illustrative embodiment.

FIG. 2A is a front perspective view of the front fork 110 in accordance with an illustrative embodiment. FIG. 2B is a rear perspective view of the front fork 110 in accordance with an illustrative embodiment. FIG. 2C is a rear elevation view of the front fork 110 in accordance with an illustrative embodiment. FIG. 2D is a front elevation view of the front fork 110 in accordance with an illustrative embodiment. FIG. 2E is a left elevation view of the front fork 110 in accordance with an illustrative embodiment. FIG. 2F is a right elevation view of the front fork 110 in accordance with an illustrative embodiment. FIG. 2G is a bottom view of the front fork 110 in accordance with an illustrative embodiment. FIG. 2H is a top view of the front fork 110 in accordance with an illustrative embodiment.

As shown in FIGS. 2A-2H, the upper crown 140 of the front fork 110 includes four mounting holes 200 that are used to mount the handlebar bracket 165 to the front fork 110. In an illustrative embodiment, the mounting holes 200 are threaded openings that receive fasteners such as bolts or screws to secure the handlebar bracket 165. Mounting of a handlebar bracket to an upper crown is depicted and described in more detail with reference to FIG. 8. In alternative embodiments, fewer or additional mounting holes may be used. The upper crown 140 also includes a threaded opening 205 that is designed to receive the threaded portion of the upper cone 115. Similarly, the lower crown 145 of the front fork 110 includes a threaded opening 210 that is designed to receive the threaded portion of the lower cone 125.

FIG. 3A is a side view of the upper cone 115 in accordance with an illustrative embodiment. FIG. 3B is a top plan view of the upper cone 115 in accordance with an illustrative embodiment. The upper cone 115 includes a threaded portion 300, a bearing interface 305, and a tapered portion 307 between the threaded portion 300 and the bearing interface 305. The threaded portion 300 of the upper cone 115 threads into an upper crown of a front fork. In an illustrative embodiment, the upper cone 115 is fixed in place once it is inserted into the upper crown of the front fork, and is not used to make adjustment the tension of the headset (i.e., the bearing assemblies). Rather, as discussed in more detail below, the lower cone 125 is used to make tension adjustments which increase/decrease the amount of play in the headset.

The bearing interface 305 of the upper cone 115 is a smooth cylindrical surface that moves in relation to an upper bearing assembly. The upper bearing assembly can be mounted in a bearing seat of a head tube using any bearing mounting technique known in the art. The interaction between the upper bearing assembly and the bearing interface 305 is low friction such that the user experiences minimal resistance when turning the handlebar of the bicycle. In an illustrative embodiment, an overall height of the upper cone 115 is 25.6 millimeters (mm). In alternative embodiments, a different dimension may be used for the height. In another illustrative embodiment, the upper cone 115 can be made from aluminum. Alternatively, other materials may be used such as carbon or stainless steel.

As shown in FIG. 3B, the upper cone 115 includes a through hole 310 that provides an unobstructed connection between the front fork and the head tube of the bicycle. As a result, one or more cables can be routed from the handlebar, through the handlebar bracket, through the through hole 310 of the upper cone 115 (which is mounted within the upper crown of the front fork), and into the head tube. From the head tube, the one or more cables can be routed to other areas/components of the bicycle via the bicycle frame. An inner diameter of the through hole 310 is 25 mm in one embodiment. Alternatively, a different sized through hole may be used.

The upper cone 115 also includes indentations 315 which are configured to receive a wrench that is used to mount (or unmount) the upper cone 115 within the upper crown of the front fork. A width of the indentations is 8 mm in an illustrative embodiment. In alternative embodiments, the upper cone 115 can include fewer or additional indentations, and/or the upper cone 115 can be configured to receive a different type of wrench.

FIG. 4A is a side view of the lower cone 125 in accordance with an illustrative embodiment. FIG. 4B is a bottom plan view of the lower cone 125 in accordance with an illustrative embodiment. The lower cone 125 includes a threaded portion 400, a bearing interface 405, and a tapered portion 407 between the threaded portion 400 and the bearing interface 405. The threaded portion 400 of the lower cone 125 threads into a lower crown of a front fork. In an illustrative embodiment, the lower cone 125 is used to make adjustment the tension of the headset (i.e., the bearing assemblies). For example, tightening the lower cone 125 in the lower crown of the front fork increases the tensioning of the headset, which decreases the amount of play in the headset. Similarly, loosening the lower cone 125 in the lower crown of the front fork reduces the tension in the headset, which increases the amount of play in the headset. In an illustrative embodiment, all headset tension adjustments are made via adjustment of the lower cone 125. One reason for using the lower cone 125 to adjust headset tension is that the lower cone 125 is accessible via the through hole in the lower crown of the front fork when the front fork is mounted on the bicycle. Conversely, the upper cone 115 is not accessible without removing the handlebar. In an alternative embodiment, both the upper cone 115 and the lower cone 125 may be used to make adjustments to the headset.

The bearing interface 405 of the lower cone 125 is a smooth cylindrical surface upon which a lower bearing assembly moves. The lower bearing assembly can be mounted in a bearing seat of a head tube using any bearing mounting technique known in the art. The interaction between the lower bearing assembly and the bearing interface 405 is low friction such that the user experiences minimal resistance when turning the handlebar of the bicycle. In an illustrative embodiment, an overall height of the lower cone 125 is 26.8 millimeters (mm) and the diameter is 36 mm. In alternative embodiments, different dimensions may be used for the lower cone. In another illustrative embodiment, the lower cone 125 can be made from aluminum. Alternatively, other materials may be used such as carbon or stainless steel.

As shown in FIG. 4B, the lower cone 125 includes a central hexagonal hole 410 that is configured to receive a hexagonal (hex) wrench such that the lower cone 125 can be tightened/loosened within the lower crown of the front fork. In an illustrative embodiment, the hexagonal hole 410 fits a 6 mm hex wrench. Alternatively, a different size of hole, a different type of hole, and/or a different type of wrench may be used to tighten/loosen the lower cone 125. The lower cone 125 also includes a plurality of openings 415 which reduce overall weight of the lower cone 125 and facilitate formation of the central hexagonal hole 410. In an alternative embodiment, the plurality of openings 415 may not be included.

FIG. 5A is a side view of the lower cone locknut 135 in accordance with an illustrative embodiment. FIG. 5B is a bottom plan view of the lower cone locknut 135 in accordance with an illustrative embodiment. The lower cone locknut 135 includes threads 500 such that the lower cone locknut 135 can be threaded into the lower crown of the front fork once the lower cone 125 is in place. As discussed above, the lower cone locknut 135 is used to preload the upper and lower bearing assemblies and to control the amount of play in the steering system of the bicycle. Once the lower cone 125 is tightened to a desired degree, the lower cone locknut 135 is used to ensure that the lower cone 125 does not move due to vibration, etc.

As shown in FIG. 5B, the lower cone locknut 135 includes a through hole 505, a circumference of which includes a plurality of indentations 510. The plurality of indentations 510 are used to mate with a wrench such that the lower cone locknut 135 can be tightened and loosened. Additionally, the through hole 505 allows simultaneous placement and use of a hex wrench in the hexagonal hole 410 in the lower cone 125 and a lower cone locknut wrench that mates with the plurality of indentations 510. The hex wrench can be used to ensure that the lower cone 125 does not rotate while the lower cone locknut 135 is being tightened. The lower cone locknut can have a height of 4.5 mm and a diameter of 36 mm in one embodiment. Alternatively, a different size of lower cone locknut may be used.

Figure 6:
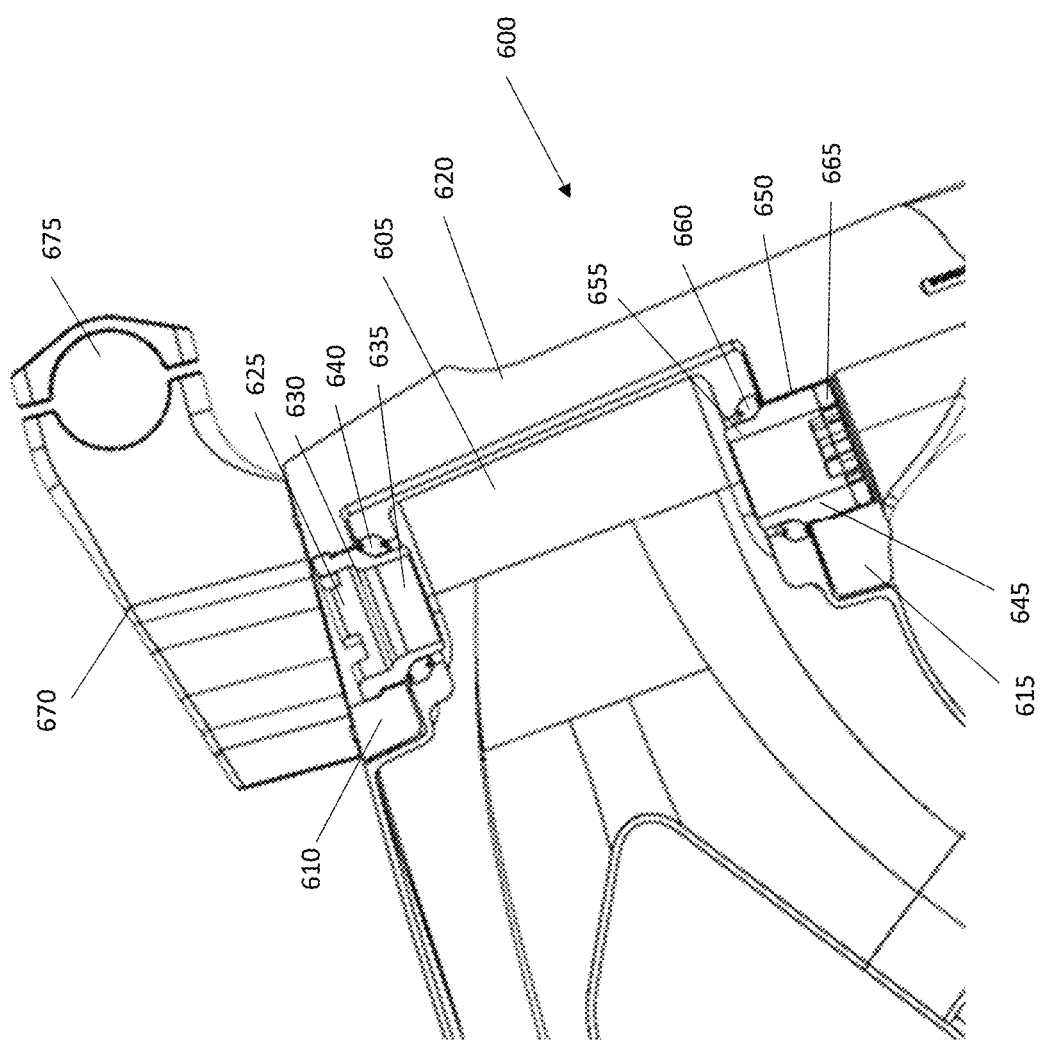
FIG. 6 is a partial cross-sectional view of a steering assembly mounted to a head tube of a bicycle in accordance with an illustrative embodiment.

FIG. 6 is a partial cross-sectional view of a steering assembly 600 mounted to a head tube 605 of a bicycle in accordance with an illustrative embodiment. The steering assembly 600 includes an upper crown 610, a lower crown 615, and a rigid crown connector 620 that rigidly connects the upper crown 610 to the lower crown 615. An upper cone 625 of the steering assembly 600 includes a threaded portion 630 and a bearing interface 635. The threaded portion 630 of the upper cone 625 is threaded into the upper crown 610, and the bearing interface 635 is in contact with an upper bearing assembly 640 that is seated within an upper portion of the head tube 605.

A lower cone 645 of the steering assembly 600 also includes a threaded portion 650 and a bearing interface 655. The threaded portion 650 of the lower cone 645 is threaded into the lower crown 615, and the bearing interface 655 is in contact with a lower bearing assembly 660 that is seated within a lower portion of the head tube 605. A lower cone locknut 665 is also threaded into the lower crown 615 of the steering assembly 600 to prevent movement of the lower cone 645 once the lower cone 645 has been tightened to a desired degree.

Also depicted in FIG. 6 is a handlebar bracket 670 mounted to the upper crown 610 of the steering assembly 600. The handlebar bracket 670 includes an opening 675 that is designed to receive and secure a handlebar (not shown) for the bicycle. As a result, any rotation (left or right) of the handlebar by a rider results in corresponding rotation of the front fork and a bicycle wheel mounted thereto. The upper bearing assembly 640 and the lower bearing assembly 660 minimize resistance between the steering assembly 600 and the head tube 605 of the bicycle frame.

As discussed herein, adjusting the preload tension of both the upper bearing assembly 640 and the lower bearing assembly 660 is performed by adjusting the lower cone 645. Specifically, tightening the lower cone 645 within the lower crown 615 results in more preload tension on both the upper bearing assembly 640 and the lower bearing assembly 660 due to the rigid crown connector 620 which integrally connects the upper crown 610 and the lower crown 615. Similarly, loosening the lower cone 645 results in less preload tension on both the upper bearing assembly 640 and the lower bearing assembly 660.

Figure 7:
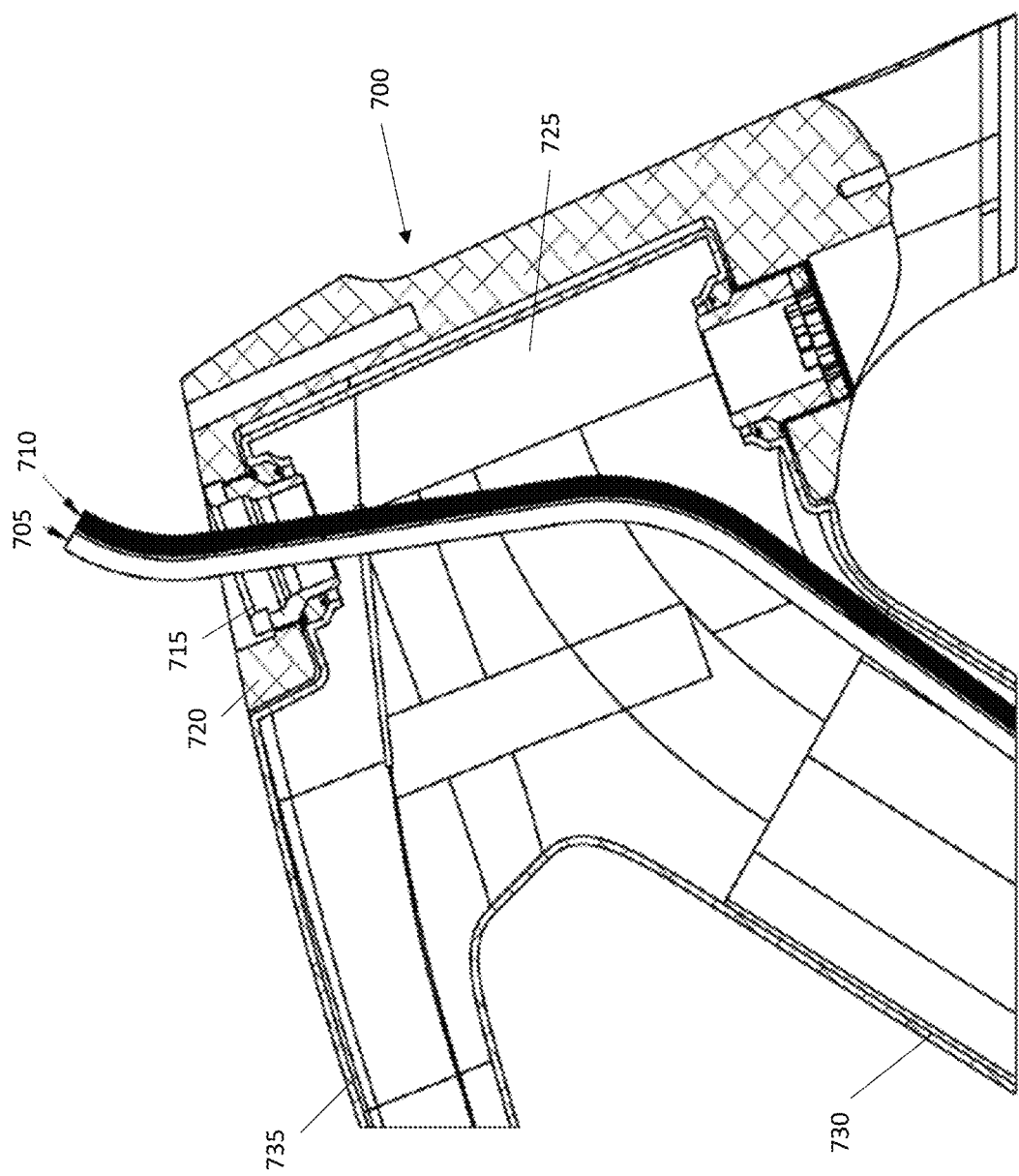
FIG. 7 is a partial cross-sectional view of a steering assembly with routed cables in accordance with an illustrative embodiment.

FIG. 7 is a partial cross-sectional view of a steering assembly 700 with routed cables in accordance with an illustrative embodiment. A first cable 705 and a second cable 710 are routed from a handlebar (not shown), through a handlebar bracket (not shown), through an upper cone 715 that is mounted to an upper crown 720 of the front fork, through a head tube 725 of the bicycle, and into a down tube 730 of the bicycle. From the down tube 730, the first cable 705 and the second cable 710 can be routed to a bicycle motor, a bicycle battery, a gear shifting assembly, a rear brake, etc. In an alternative embodiment, fewer or additional cables can be routed from the handlebar into the bicycle frame. Additionally, one or more cables can also be routed into a top tube 735 of the bicycle frame.

Figure 8:
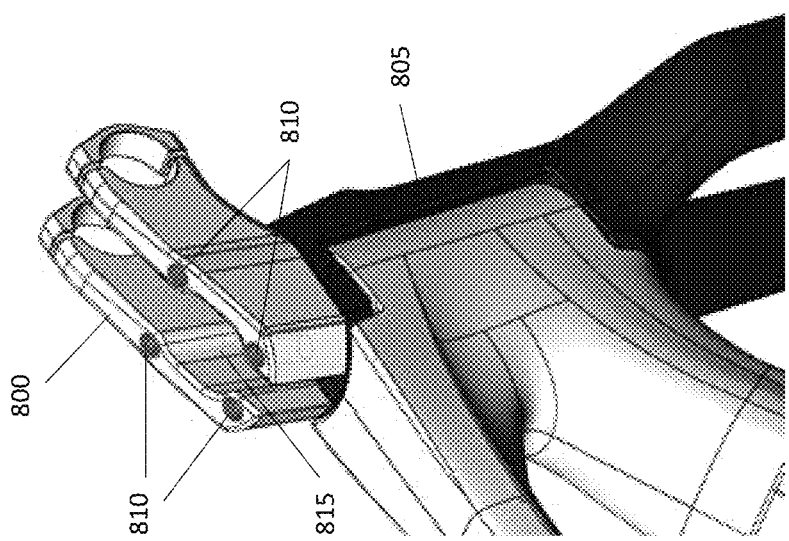
FIG. 8 is a partial view of a handlebar bracket mounted to a front fork in accordance with an illustrative embodiment.

FIG. 8 is a partial view of a handlebar bracket 800 mounted to a front fork 805 in accordance with an illustrative embodiment. As shown, the handlebar bracket 800 includes holes 810 that receive fasteners such as screws or bolts. The holes 810, which can align with the mounting holes 200 in the upper crown 140 depicted in FIGS. 2A and 2B, can be threaded or unthreaded depending on the embodiment. In an alternative embodiment, the handlebar bracket may be an integral component of the front fork that is connected thereto by way of molding, welding, soldering, etc. The handlebar bracket 800 also includes a cavity 815 that aligns with the through hole in the upper cone and with an opening in the handlebar to provide an unobstructed pathway so that cables can be routed from an interior cavity of the handlebar to the head tube.

Figure 9:
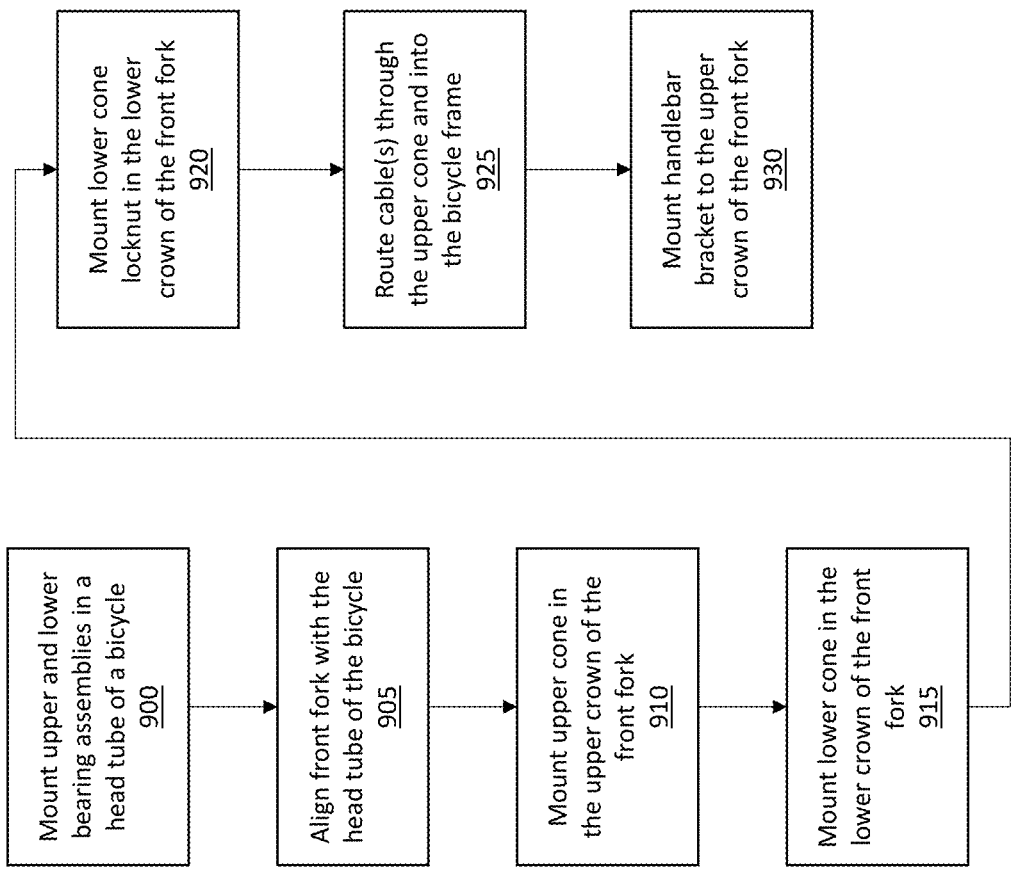
FIG. 9 is a flow diagram depicting operations performed to assemble a steering system of a bicycle in accordance with an illustrative embodiment.

FIG. 9 is a flow diagram depicting operations performed to assemble a steering system of a bicycle in accordance with an illustrative embodiment. In alternative embodiments, fewer, additional, and/or different operations may be performed. Also, the use of a flow diagram is not meant to be limiting with respect to the order of operations performed. In an operation 900, upper and lower bearing assemblies are mounted in a head tube of a bicycle frame. The head tube includes an upper bearing seat (in an upper portion of the head tube) that receives the upper bearing assembly and a lower bearing seat (in a lower portion of the head tube) that receives the lower bearing assembly.

In an operation 905, a front fork is aligned with the head tube of the bicycle. Specifically, a threaded opening in an upper crown of the front fork is aligned with an upper opening in the head tube, and a threaded opening in a lower crown of the front fork is aligned with a lower opening in the head tube. In an operation 910, an upper cone is mounted in the upper crown of the front fork. In an illustrative embodiment, the upper cone is threaded into the upper crown such that a bearing interface of the upper cone contacts an inner surface of the upper bearing assembly which is seated in the upper portion of the head tube. The upper cone, which is fixed and not used to make adjustments to the preload tension of the bearing assemblies, is fully tightened within the upper crown. In an alternative embodiment, the upper cone may be used in addition to the lower cone to adjust the preload tension of the bearing assemblies.

In an operation 915, a lower cone is mounted in the lower crown of the front fork. In an illustrative embodiment, the lower cone is threaded into the lower crown such that a bearing interface of the lower cone contacts an inner surface of the lower bearing assembly which is seated in the lower portion of the head tube. The lower cone is tightened to a degree that achieves a desired amount of preload tension between the upper and lower bearing assemblies. The amount of preload tension controls the amount of play in the steering system (i.e., greater preload tension results in less play and vice versa).

In an operation 920, a lower cone locknut is mounted within the lower crown for the front fork. As discussed herein, the lower cone locknut is used to prevent movement of the lower cone once the lower cone is in a desired position. To prevent movement of the lower cone while the lower cone locknut is being mounted, a hex (or other) wrench used to mount the lower cone can be used to hold the lower in place during tightening of the lower cone locknut with a different wrench (e.g., a wrench that matches the internal configuration of the lower cone locknut 135 as depicted in FIG. 5B).

In an operation 925, one or more cables are routed through the upper cone and into the bicycle frame. The one or more cables can be routed from the upper cone, into the head tube, and from the head tube into either a top tube or a down tube of the bicycle frame. The unobstructed interior of the head tube due to the lack of an internal steerer tube enables a plurality of different cables to be internally routed to any desired area of the bicycle frame. In an operation 930, a handlebar bracket (which can include a handlebar mounted thereto) is mounted to the upper crown of the front fork. The handlebar bracket can be mounted using fasteners as described with reference to FIG. 8. In an alternative embodiment, the one or more cables may be routed after the handlebar bracket is mounted to the upper crown of the front fork.

Figure 10:
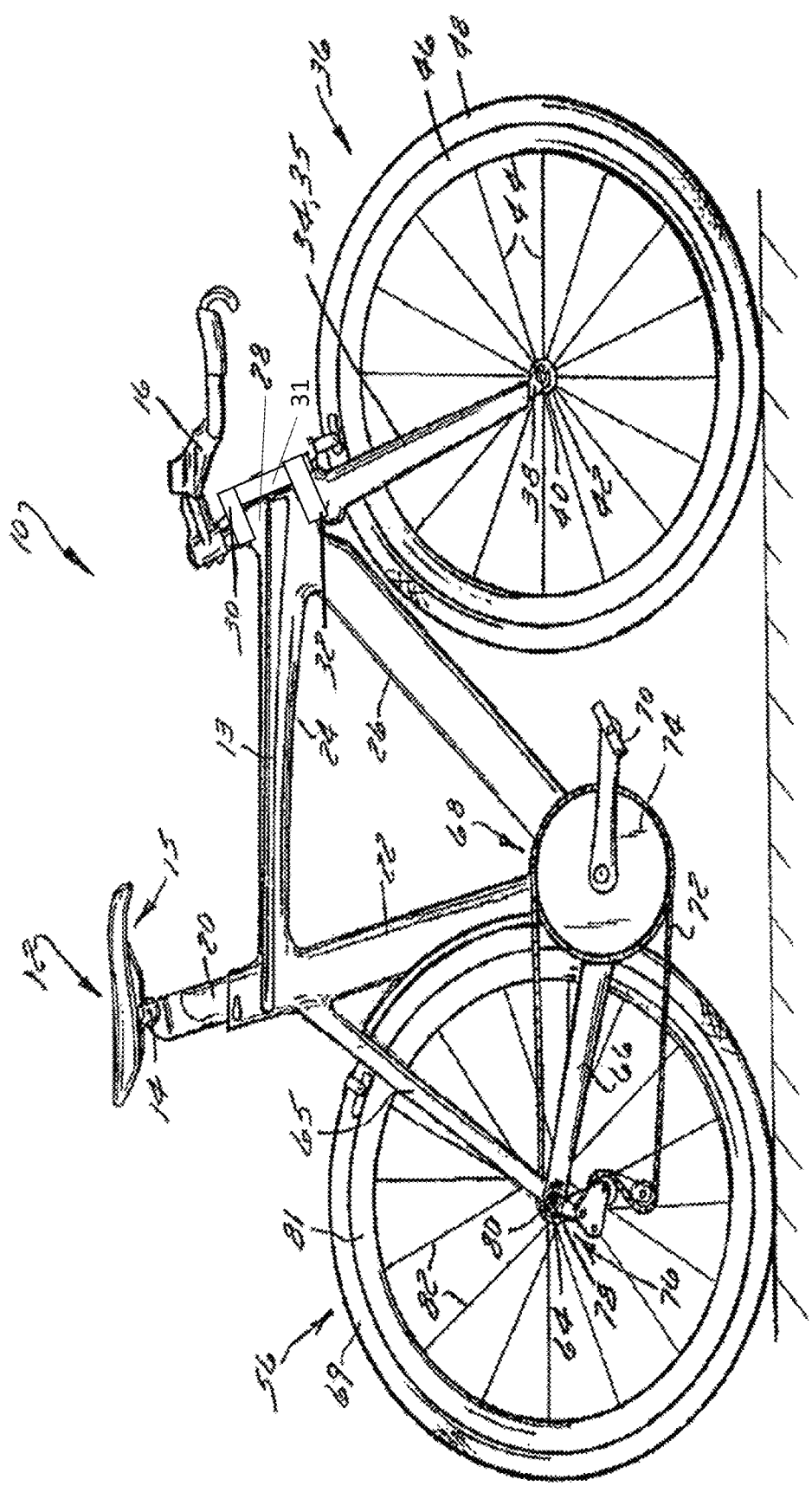
FIG. 10 depicts a bicycle that includes a dual crown steering assembly in accordance with an illustrative embodiment.

FIG. 10 depicts a bicycle 10 that includes a dual crown steering assembly in accordance with an illustrative embodiment. The bicycle 10 includes a frame 13 to which a seat assembly 12 and handlebars 16 are attached. A seat clamp 14 is engaged with an underside 15 of seat assembly 12 and cooperates with a seat post 20 that slidably engages a seat tube 22 of frame 13. A top tube 24 and a down tube 26 extend forwardly from seat tube 22 to a head tube 28 of frame 13.

Handlebars 16 are connected to an upper crown 30 of a dual crown steering assembly, which is mounted to the head tube 28 via an upper cone and upper bearing assembly as described herein. The upper crown 30 is connected to a lower crown 32 of the dual crown steering assembly by way of a rigid crown connector 31. The lower crown 32 is mounted to the head tube 28 via a lower cone and lower bearing assembly as described herein. A pair of fork blades 34, 35 extend from generally opposite ends of the dual crown steering assembly and are constructed to support a front wheel assembly 36 at an end thereof or fork tip 38. The fork blades 34, 35 can be part of a suspension bicycle fork or a rigid bicycle fork. As also shown in FIG. 1, fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A rear wheel assembly 56 is positioned generally concentrically about a rear axle 64. A seat stay 65 and a chain stay 66 offset rear axle 64 from a crankset 68. The crankset 68 includes pedals 70 that are operationally connected to a flexible drive such as a chain 72 via a chain ring or sprocket 74. Rotation of the chain 72 communicates a drive force to a rear section 76 of the bicycle 10 having a gear cluster 78 positioned thereat. The gear cluster 78 is generally concentrically orientated with respect to the rear axle 64 and includes a number of variable diameter gears. The gear cluster 78 is operationally connected to a hub 80 associated with a rear tire 69 of rear wheel assembly 56. A number of spokes 82 extend radially between the hub 80 and a rim 81 that supports tire 69 of rear wheel assembly 56. As is commonly understood, rider operation of the pedals 70 drives the chain 72 thereby driving the rear tire 69 which in turn propels the bicycle 10.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A steering assembly for a bicycle, comprising:
   a front fork that includes an upper crown, a lower crown, and a rigid crown connector that connects the upper crown to the lower crown;
   an upper cone configured to mount to the upper crown of the front fork, wherein the upper cone includes an upper cone bearing interface configured to interact with an upper bearing assembly seated in an upper portion of a head tube of a bicycle frame;
   a lower cone configured to mount to the lower crown of the front fork, wherein the lower cone includes a lower cone bearing interface configured to interact with a lower bearing assembly seated in a lower portion of the head tube of the bicycle frame, wherein the lower cone includes a threaded portion that is threaded into a through hole in the lower crown; and
   a lower cone locknut that is configured to thread into the through hole in the lower crown adjacent to the lower cone to prevent movement of the lower cone.

2. The steering assembly of claim 1, wherein the rigid crown connector is contoured to match an outer surface of the head tube.

3. The steering assembly of claim 1, wherein the upper cone includes a through hole that is configured to receive one or more cables that are routed from a handlebar of the bicycle to an interior of the head tube of the bicycle.

4. The steering assembly of claim 1, wherein the upper cone includes a threaded portion that is threaded into a through hole in the upper crown.

5. The steering assembly of claim 1, wherein the lower cone is configured to be rotated by a first wrench and the lower cone locknut is configured to be rotated by a second wrench that is different from the first wrench, and wherein the lower cone and the lower cone locknut are configured such that the first wrench and the second wrench can be used simultaneously.

6. The steering assembly of claim 1, wherein the upper cone includes a plurality of slots configured to receive a tool used to mount the upper cone.

7. The steering assembly of claim 1, further comprising a handlebar bracket that is configured to mount to the upper crown and to a handlebar.

8. The steering assembly of claim 7, wherein the handlebar bracket includes a cavity that aligns with a through hole in the upper cone.

9. The steering assembly of claim 8, wherein the cavity in the handlebar bracket also aligns with an opening in the handlebar such that one or more cables are routed from an interior of the handlebar, through the opening in the handlebar, through the cavity in the handlebar bracket, through the through hole in the upper cone, and into the head tube.

10. A method of assembling a steering assembly, the method comprising:
   mounting an upper bearing assembly in an upper portion of a head tube of a bicycle frame and a lower bearing assembly in a lower portion of the head tube;
   mounting an upper cone to an upper crown of a front fork such that a bearing interface of the upper cone is positioned in an interior of the upper bearing assembly within the upper portion of the head tube;
   mounting a lower cone to a lower crown of the front fork such that a bearing interface of the lower cone is positioned in an interior of the lower bearing assembly within the lower portion of the head tube, wherein the lower crown is integrally connected to the upper crown by a rigid crown connector, and wherein mounting the lower cone comprises threading the lower cone into a through hole of the lower crown; and mounting a lower cone locknut to the lower crown by threading the lower cone locknut into the through hole in the lower crown such that the lower cone locknut is adjacent to and prevents movement of the lower cone.

11. The method of claim 10, further comprising aligning the front fork such that a rear surface of the rigid crown connector is adjacent to an external surface of the head tube.

12. The method of claim 10, wherein:
the lower cone is threaded into the through hole of the lower crown with a first tool; and
the lower cone locknut is threaded into the through hole of the lower crown with a second tool that is different from the first tool.

13. The method of claim 12, further comprising using the first tool to hold the lower cone in place while using the second tool to mount the lower cone locknut.

14. The method of claim 10, further comprising mounting a handlebar bracket to an upper surface of the upper crown such that a cavity in the handlebar bracket aligns with a through hole of the upper cone.

15. The method of claim 14, further comprising routing one or more cables from an interior of a handlebar through the cavity in the handlebar bracket, through the through hole of the upper cone, and into the head tube.

16. The method of claim 15, further comprising mounting the handlebar onto the handlebar bracket such that an opening from which the one or more cables exit the handlebar aligns with the cavity in the handlebar bracket.

17. The method of claim 10, further comprising routing a cable through an opening in the rigid crown connector such that at least a portion of the cable is routed in between the head tube and the rigid crown connector.

\* \* \* \* \*